US012712945B2

(12) United States Patent
Guitart et al.

(10) Patent No.: US 12,712,945 B2
(45) Date of Patent: Aug. 18, 2026

(54) COUNTERFACTUAL ANALYSIS OF USER MODELS FOR PRESCRIPTIVE OUTPUT

(71) Applicant: TRANS UNION LLC, Chicago, IL (US)

(72) Inventors: Antoni Guitart, Chicago, IL (US); Pratibha Prabhu, Chicago, IL (US)

(73) Assignee: TRANS UNION LLC, Chicago, IL (US)

(*) Notice: Subject to any disclaimer, the term of this patent is extended or adjusted under 35 U.S.C. 154(b) by 0 days.

(21) Appl. No.: 18/466,566

(22) Filed: Sep. 13, 2023

(65) Prior Publication Data

US 2025/0088563 A1 Mar. 13, 2025

(51) Int. Cl.
*H04L 67/306* (2022.01)
*H04L 67/50* (2022.01)

(52) U.S. Cl.
CPC .......... *H04L 67/306* (2013.01); *H04L 67/535* (2022.05)

(58) Field of Classification Search
CPC ............................ H04L 67/306; H04L 67/535
See application file for complete search history.

(56) References Cited

U.S. PATENT DOCUMENTS 7,249,076 B1 * 7/2007 Pendleton ............ G06Q 20/102 705/40
8,650,110 B2 2/2014 Green
9,882,918 B1 1/2018 Ford et al.
10,552,471 B1 * 2/2020 Dandekar .......... G06V 10/7715
12,580,932 B1 * 3/2026 McAleer ............. H04L 63/1425
2003/0120572 A1 * 6/2003 Coventry ............... G06Q 40/02 705/35
2004/0199456 A1 * 10/2004 Flint ...................... G06Q 30/02 705/38
2017/0032460 A1 * 2/2017 Szollar ................... G06Q 40/03
2017/0124464 A1 5/2017 Crabtree et al.
2021/0043172 A1 * 2/2021 Yamagiwa ............... G10G 1/00
2023/0344803 A1 * 10/2023 Courtwright ....... H04L 63/0421
2025/0071127 A1 * 2/2025 Toutain ............... H04L 63/1416
2026/0023892 A1 * 1/2026 Chopra ................... G06F 30/20

OTHER PUBLICATIONS

International Search Report and Written Opinion of the International Searching Authority directed to International Patent Application No. PCT/US2024/046335, mailed Dec. 5, 2024; 7 pages.

* cited by examiner

*Primary Examiner* — Dhairya A Patel
(74) *Attorney, Agent, or Firm* — Sterne, Kessler, Goldstein & Fox P.L.L.C.

(57) ABSTRACT

Status influence elements indicated by a user model of a target user are identified in response to an indication that the status of a digital identity for the target user is less than a status threshold. Status influence elements indicated user models for each user of a pool of users with digital identities that satisfy the status threshold are also identified. Distances between the target user and each user of the pool are calculated. Instructions for modifying the status of the digital identity for the target user to satisfy the status threshold are generated according to the respective user model for a model user from the pool based on the distance between the target user and the model user being a minimum calculated distance.

20 Claims, 7 Drawing Sheets

400

| | Counterfactual Guidance | Adverse Action Codes |
|---|---|---|
| Provide an empirical ranking of decline reasons | ✓ | ✓ |
| Uses flexible reference point, linked to approval cutoff score | ✓ | ✗ |
| Limited to actions that can be reasonably undertaken by consumer | ✓ | ✗ |
| Has an established and enforced regulatory framework | ✗ | ✓ |

| Attribute | Range | |
|---|---|---|
| Length of credit experience | 5-10 years | 5-10 years |
| Number of trades ever 60 days past due or worse | 1-2 | 1-2 |
| Number of satisfactory open trades | 3-6 | 3-6 |
| Number of inquiries in the last 6 months | 0-1 | 0-1 |
| Total unpaid non-medical collections | $1-$500 | $0 |
| Credit Card utilization | 60-80% | 20-30% |
| Total past due balances | $1-$1,000 | $0 * |
| Number of trades currently 30 days past due or worse | 1 | 0 * |
| Score | 650 | 700 |
| Credit Decision | Declined | Approved |

Invariant features: Not eligible for counterfactual analysis because it is not within the control of the consumer to change them in the short-run.

Parity features: Not invariant in the short-run, but not relevant to the counterfactuals because we observe parity between the target consumer and the counterfactual.

Counterfactual features: These are the features that the consumer needs to change to reach a score of 700, the approval threshold.

* Note: These 2 features are strictly co-dependent. Addressing one automatically addresses the other one.

FIG. 5

COUNTERFACTUAL ANALYSIS OF USER MODELS FOR PRESCRIPTIVE OUTPUT

BACKGROUND

Maintaining a positive digital identity is crucial in today's interconnected world, where personal, economic, and professional spheres often intersect online. A well-curated digital identity can qualify an individual for or enable transactions including commercial, financial, insurance-related, healthcare-related, and/or credit-related transactions. For example, the status of a digital identity may dictate whether a user can open a new bank account and/or a new credit card, execute a transaction with a merchant device, and/or the like. The status of a digital identity may be affected (e.g., generated, changed, etc.) by a user model (e.g., online behavior, financial activity, spending patterns, credit utilization, etc.). A user with a digital identity that has been adversely affected by a user model is routinely unable to receive guidance on how to improve, alter, and/or modify the status of their digital identity.

SUMMARY

Provided herein are system, apparatus, device, method and/or computer program product embodiments, and/or combinations and sub-combinations thereof, for counterfactual analysis of user models for prescriptive output. One or more computing devices may identify a plurality of status influence elements indicated by a user model of a target user. Identification of the plurality of status influence elements indicated by the user model of a target user may be responsive to an indication that a status of a digital identity for the target user is less than a status threshold for digital identities eligible for a transaction. A respective plurality of status influence elements indicated by a respective user model for each user of a pool of users with respective digital identities that satisfy the status threshold may also be identified. A respective distance between the target user and each user of the pool may be calculated based on respective weighted values that represent a degree of influence on eligibility for the transaction assigned to the respective plurality of status influence elements indicated by the respective user model for each user of the pool and the plurality of status influence elements indicated by the user model of the target user. Based on the respective distance between the target user and a model user from the pool being a minimum calculated distance, the respective user model for the model user may be used to generate instructions for modifying the status of the digital identity for the target user to satisfy the status threshold.

BRIEF DESCRIPTION OF THE DRAWINGS

The accompanying drawings are incorporated herein and form a part of the specification.

FIG. 4 is an example comparison chart, according to some aspects of this disclosure.

FIG. 5 is an example chart of status influence elements from user models, according to some aspects of this disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
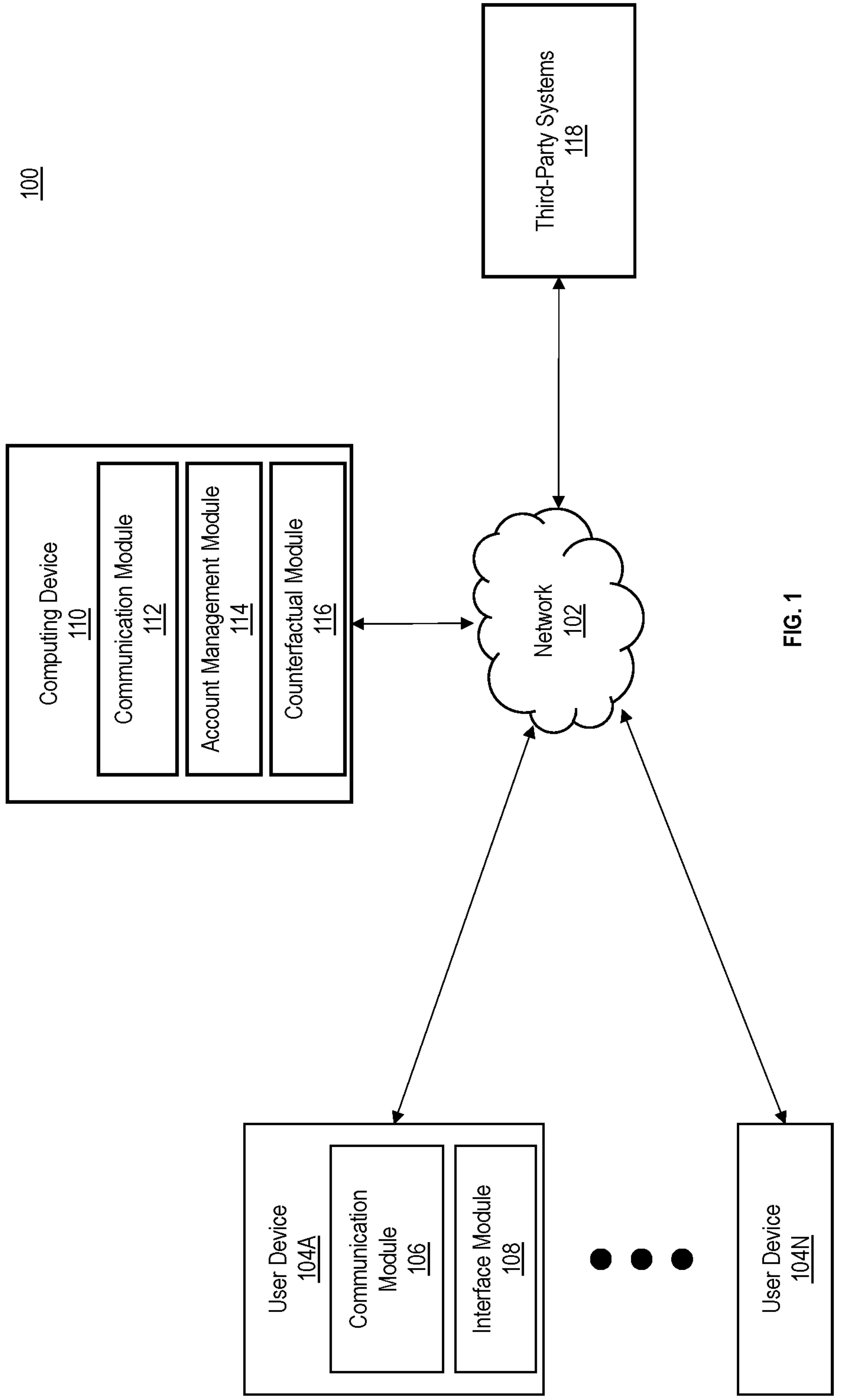
FIG. 1 is a block diagram of an example system for counterfactual analysis of user models for prescriptive output, according to some aspects of this disclosure.

Provided herein are system, apparatus, device, method and/or computer program product embodiments, and/or combinations and sub-combinations thereof, for counterfactual analysis of user models for prescriptive output. The status of a digital identity may be affected by a user model (e.g., online behavior, financial activity, spending patterns, credit utilization, etc.). Responsive to an identified status of a digital identity, such as a status that falls below a defined threshold, and/or the like, prescriptive guidance on how to improve, alter, and/or modify the status of the digital identity may be generated.

For example, guidance on how to improve a credit score may be provided to a user who is denied approval for a transaction based on a digital identity indicative of the credit score and/or the like. Guidance and/or instructive data regarding how to improve, alter, and/or modify the status of a digital identity may be prescriptive and specific to the context of achieving a particular goal (e.g., credit approval, etc.). The guidance and/or instructive data may indicate actionable and legitimate behaviors that are feasible for the user to perform/achieve. Further, guidance and/or instructive data may be based on empirically observed data from observed outcomes, such that any forecasted outcome from the implementation of the guidance and/or instructive data is readily realized and may be calibrated to any desired threshold.

User models (e.g., functional representations of user credit-related activity, account balances, transaction history, etc.) used in the generation of guidance and/or instructive data may be derived independently from the identification of counterfactuals used to generate the guidance and/or instructive data. For example, for a target user (e.g., a user with a digital identity status that falls below a threshold or intended status, etc.), user data and/or user profile-level data collected from a plurality of sources (e.g., analytic service providers, entity data repositories, telemetry data, etc.) may be used to generate a user model that is paired with the user model of another user with digital identity status influence elements that best match the target user. The paired user may be a user with a digital identity that satisfies a particular threshold or meets a defined goal. Status influence elements from the user model of the paired user may be used as counterfactuals to generate guidance for improving, modifying, and/or altering the status of the digital identity of the target user. Status influence elements may include, but are not limited to, any factors, occurrences, conditions, actions, and/or the like indicated by and/or associated with a user profile that affect the status of the digital identity of a user. For example, the status of the digital identity of a user may be indicated by a credit score output by a credit bureau and/or the like.

According to some aspects of this disclosure, optimization of the guidance for improving, modifying, and/or altering the status of the digital identity of the target user derived from counterfactual observation may be based on minimizing the normalized sum of distances between each transformed feature required to cause a shift in the output of a given observation. As described herein, the system, apparatus, device, method and/or computer program product embodiments, and/or combinations and sub-combinations thereof, for counterfactual analysis of user models for prescriptive output provide precise and granular guidance on how to achieve desired goals based on a user model without a need to modify the user model itself or perform simulation of model inputs to drive counterfactual scenarios. One or more constraints may be implemented to manage sparsity, proximity, and/or plausibility parameters during counterfactual evaluation and guidance generation to identify a concrete and reasonably achievable path to any desired outcome. According to some aspects of this disclosure, the prescriptive output may include instructions for modifying, improving, and/or altering a digital identity represented as a credit score (e.g., such as a credit score for a user that is output by a credit bureau). In a scenario where a digital identity represents a credit score, status influence elements of a user model may include any factors that influence the credit score and counterfactual analysis of user models for prescriptive output may provide a target user with options that may improve their credit score, in general or to a given level.

For example, credit applications generate an initial touchpoint between lenders and consumers that can prove critical to the lifetime value of a customer. For approved candidates, this touchpoint often leads to lengthy business relationships that are both advantageous for consumers and profitable for lenders. However, for declined candidates, this touchpoint ends abruptly and often as a negative experience for the consumer and a potential loss opportunity for the lender, especially for those declines near the approval boundary. The system, apparatus, device, method and/or computer program product embodiments, and/or combinations and sub-combinations thereof, for counterfactual analysis of user models for prescriptive output, as described herein, provide a way to recapture the described credit application touchpoint value by identifying declined candidates and pairing user models of the declined candidates with the user models of users that have similar behavioral patterns as the declined candidates yet have approved credit applications, and using those similar behavioral patterns to generate prescriptive guidance for the declined candidates.

Traditionally, the rules and/or models used to identify or determine users with a given status of a digital identity are determined by the entities intent on determining such users. For example, in the scenario where a given credit score is used as a threshold for a credit application approval, the decisioning rules evaluating the credit score are lender-specific. Therefore, an objective of identifying actionable paths for users declined in a credit application and/or achieving other credit expansion objectives traditionally requires a change in the lender-specific decisioning rules. Changes in the lender-specific decisioning rules are generally not risk-neutral and may result in analytical errors when new decisioning rules are untested or unreliable. Proper testing and/or achieving reliability of new decisioning rules may require extensive champion/challenger surrogate retro analysis and live A/B testing over an extended period.

The system, apparatus, device, method and/or computer program product embodiments, and/or combinations and sub-combinations thereof, for counterfactual analysis of user models for prescriptive output, as described herein, provide a way to identify actionable paths for users declined in a credit application and/or meet other the credit expansion objectives without changing any lender-specific decisioning rule. Precise and granular prescriptive guidance regarding the changes in a credit profile required to achieve approval of a credit application or any other desired goal may be generated without changing any lender-specific decisioning rule. The guidance output from the counterfactual analysis of user models, as described herein, offers a degree of certainty that a given credit score or other credit objective will result from the implementation of prescriptive changes, under reasonable assumptions. Entities (e.g., lender, etc.) requesting counterfactual analysis of user models have complete flexibility to define the sparsity (e.g., the maximum number of feature changes allowed, etc.), proximity (e.g., the maximum size of the changes allowed in each feature, etc.), and plausibility (e.g., criteria for what constitutes a plausible change to make, etc.) parameters used in the analysis. Therefore, in contrast to traditional explainability methods used in the technological field of credit score management, for example, adverse action code generation, counterfactual analysis of user models for prescriptive output, as described herein, generates a concrete and reasonably achievable path (e.g., set of instructions, etc.) to a desired outcome. Additionally, counterfactual analysis of user models for prescriptive output, as described herein, enables empirical ranking of decline reasons for a user decline in a credit application based on a credit score. Counterfactual analysis of user models for prescriptive output, as described herein, uses flexible reference points, linked to approval cutoff scores. Prescriptive guidance output from counterfactual analysis of user models for prescriptive output, as described herein, includes actions that can be reasonably undertaken by a user, rather than the generic prescriptions provided by action codes. These and other advantages are described herein.

FIG. 1 shows a block diagram of an example system 100 for counterfactual analysis of user models for prescriptive output. System 100 is merely an example of one suitable system environment and is not intended to suggest any limitation as to the scope of use or functionality of aspects described herein. Neither should the system 100 be interpreted as having any dependency or requirement related to any single device/module/component or combination of devices/modules/components described therein.

According to some aspects of this disclosure, system 100 may include a network 102. According to some aspects of this disclosure, network 102 may include a packet-switched network (e.g., internet protocol-based network), a non-packet switched network (e.g., quadrature amplitude modulation-based network), and/or the like. According to some aspects of this disclosure, network 102 may include network adapters, switches, routers, modems, and the like connected through wireless links (e.g., radiofrequency, satellite) and/or physical links (e.g., fiber optic cable, coaxial cable, Ethernet cable, or a combination thereof). Network 102 may include public networks, private networks, wide area networks (e.g., Internet), local area networks, and/or the like. According to some aspects of this disclosure, network 102 may include a content access network, content distribution network, and/or the like. According to some aspects of this disclosure, network 102 may provide and/or support communication from telephone, cellular, modem, and/or other electronic devices to and throughout the system 100. For example, system 100 may include and support communications between user devices 104A-104N, a computing device 110, and third-party systems 118 via network 102.

According to some aspects of this disclosure, user devices 104A-104N may be part of a client and/or user computing system and/or infrastructure. For example, user devices 104A-104N may represent a plurality of user devices in communication and/or interoperability within a client and/or user computing system and/or infrastructure. Although user device 104A is described herein in greater detail, each user device 104A-104N may be similarly configured.

According to some aspects of this disclosure, user device 104A may include, for example, a smart device, a mobile device, a laptop, a tablet, a display device, a computing device, or any other device capable of communicating with computing device 110, third-party systems 118, and/or any other device/component of system 100, either described or unshown. User device 104A may include communication module 106 that facilitates and/or enables communication with network 102 (e.g., devices, components, and/or systems of network 102, etc.), computing device 110, and/or any other device/component of system 100. For example, communication module 106 may include hardware and/or software to facilitate communication. According to some aspects of this disclosure, communication module 106 may include one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. According to some aspects of this disclosure, communication module 106 may include any hardware and/or software necessary to facilitate communication.

According to some aspects of this disclosure, User device 104A may include an interface module 108. According to some aspects of this disclosure, interface module 108 enables a user to interact with user device 104, network 102, computing device 110, and/or any other device/component of system 100. Interface module 108 may include any interface for presenting and/or receiving information to/from a user.

According to some aspects of this disclosure, interface module 108 enables a user to view and/or interact with content, applications, web pages, and/or user interfaces. According to some aspects, interface module 108 may include a web browser (e.g., Internet Explorer®, Mozilla Firefox®, Google Chrome®, Safari®, or the like). According to some aspects, interface module 108 may include one or more applications including credit management applications, financial applications, e-commerce applications, identity management applications, and/or the like. According to some aspects, interface module 108 may request or query various files from a local source and/or a remote source, such as computing device 110, third-party systems 118, and/or any other device/component of system 100. For example, interface module 108 may facilitate one or more transactions including credit approval transactions, product purchase transactions, communication-based transactions, and/or the like.

According to some aspects, interface module 108 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to interact with a user interface generated and/or displayed by the interface module 108 and/or the like. For example, interaction with the input devices and/or components may enable a user to review prescriptive data and/or guidance instructions for modifying, improving, and/or altering a digital identity status. According to some aspects, interaction with the input devices and/or components may enable a user to request the generation of prescriptive data and/or guidance instructions for modifying, improving, and/or altering a digital identity.

According to some aspects of this disclosure, user devices 104A-104N may generate and/or output data/information that may be used to build user profiles for users of the user devices 104A-104N. For example, data indicative of usage of financial or investment applications may be used to indicate financial literacy or involvement, data indicative of the frequency and types of online purchases may be tracked to indicate user spending habits, location data from user devices 104A-104N may indicate and/or be used to infer behavior patterns, data indicative of how users interact on web-based, online, and social media platforms may indicate and/or be used to infer behavior patterns, and/or the like.

According to some aspects of this disclosure, data/information that may be used to build user profiles for users of the user devices 104A-104N may be collected and/or provided via third-party systems 118. Third-party systems 118 may include a system, compute infrastructure/architecture, and/or software platform configured to access a plurality of software applications, services, and/or data sources. Third-party systems 118 may include, facilitate, and/or support social networks, payment networks, blockchain, e-commerce, financial transactions, payment acceptance/remittance services, content acquisition and delivery services, identity management and security systems, and/or the like.

Third-party systems 118 may include, access, support, and/or host any applications and/or data through any delivery paradigm, including but not limited to remote or distributed cloud computing solutions, local or on-premises software ("on-premise" cloud-based solutions), cloud-based services, "as a service" models (e.g., content as a service (CaaS), digital content as a service (DCaaS), software as a service (SaaS), managed software as a service (MSaaS), platform as a service (PaaS), backend as a service (BaaS), mobile backend as a service (MBaaS), infrastructure as a service (IaaS), etc.), and/or the like. Third-party systems 118 may include and/or support systems including, but not limited to, commercial entities (e.g., merchant devices, e-commerce platforms, etc.), financial institutions and/or finance-supporting institutions (e.g., banks, credit card companies, government agencies, etc.), and/or the like that interact with user devices 104A-104N. Data and/or information communicated between user devices 104A-104N and third-party systems 118 may be collected and used to generate a user model for user devices 104A-104N and/or users of user devices 104A-104N.

According to some aspects of this disclosure, computing device 110 may include a server, a cloud-based compute resource, an entity-controlled device, or any other device capable of communicating with user devices 104A-104N, third-party systems 118, and/or any other device/component of system 100, either described or (un) shown. Although shown as a single device, according to some aspects of this disclosure, computing device 110 may be part of a computing system and/or infrastructure, and/or may represent a plurality of computing devices. For example, computing device 110 may represent a plurality of computing devices in communication with user devices 104A-104N, third-party systems 118, and/or any other device/component of system 100.

According to some aspects of this disclosure, computing device 110 may include communication module 112 that facilitates and/or enables communication with network 102

(e.g., devices, components, and/or systems of network 102, etc.), user devices 104A-104N, third-party systems 118, and/or any other device/component of system 100. For example, communication module 112 may include hardware and/or software to facilitate communication. According to some aspects of this disclosure, communication module 112 may include one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. According to some aspects of this disclosure, communication module 112 may include any hardware and/or software necessary to facilitate communication.

According to some aspects of this disclosure, computing device 110 may include an interface module 114. According to some aspects of this disclosure, interface module 114 enables a user to interact with computing device 110, network 102, user device 104A-104N, third-party systems 118, and/or any other device/component of system 100. Interface module 114 may include any interface for presenting and/or receiving information to/from a user.

According to some aspects of this disclosure, interface module 114 enables a user to view and/or interact with user data, applications, web pages, and/or user interfaces. According to some aspects, interface module 114 may include a web browser (e.g., Internet Explorer®, Mozilla Firefox®, Google Chrome®, Safari®, or the like). According to some aspects, interface module 114 may include one or more applications including credit management applications, financial applications, e-commerce applications, and/or the like. According to some aspects, interface module 114 may request, receive, or query various files from a local source and/or a remote source, such as user devices 104A-104N, third-party systems 118, and/or any other device/component of system 100. For example, interface module 114 may be used to provide constraints and/or counterfactual data relating to credit approval transactions, product purchase transactions, and/or the like, used to build, analyze, and/or modify user models.

According to some aspects, interface module 114 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to interact with a user interface generated and/or displayed by the interface module 112 to provide constraints and/or counterfactual data relating to credit approval transactions, product purchase transactions, and/or the like, used to build, analyze, and/or modify user models.

According to some aspects of this disclosure, to facilitate counterfactual analysis of user models for prescriptive output, computing device 110 may include a counterfactual module 116. Counterfactual module 116 may generate user models (e.g., functional representations of user online activity, social media activity, e-commerce activity, etc.) and/or user models (e.g., functional representations of user credit-related activity, account balances, transaction history, etc.) for users of user devices 104A-104N and/or user devices 104A-104N. According to some aspects of this disclosure, counterfactual module 116 may receive, request, and/or access user information from user devices 104A-104N and/or third-party services 118 to generate user models.

According to some aspects of this disclosure, user models may be logical, mathematical, and/or data constructs that represent relationships between different variables or features that influence the status of a digital identity. According to some aspects of this disclosure, user models may be behavior models that capture complex behavioral patterns using mathematical functions, algorithms, and/or computational models. For example, according to some aspects of this disclosure, user models may include linear models, non-linear models, stochastic models, time-series models, state-space models, agent-based models, and/or the like. User models may include both mutable and immutable features (e.g., status influence elements, etc.).

According to some aspects of this disclosure, counterfactual module 116 may utilize a trained predictive model to identify mutable and immutable features from user data and/or behavioral data. For example, counterfactual module 116 may collect data on a variety of user behaviors and influencers from user devices 104A-104N and third-party systems 118. This can include immutable factors like the age of a financial/credit profile, etc., as well as mutable factors like recent purchase history, credit utilization, balances on open accounts, and/or the like. The data collected may be cleaned and/or normalized by addressing/substituting any missing values, encoding categorical variables, scaling numerical variables, and/or the like.

According to some aspects of this disclosure, counterfactual module 116 may identify the most relevant factors/features that could influence user identity and/or user behavior. For example, counterfactual module 116 may use correlation matrices, mutual information, wrapper methods, and/or the like to select a subset of features for training the predictive model(s). According to some aspects, counterfactual module 116 may generate new features (e.g., via an iteration of terms between features, etc.) that might capture the relationships between mutable and immutable factors more effectively. Counterfactual module 116 may use one or more methods including, but not limited to, linear additive models and/or the like operating on a training dataset to interpret feature importance. When training and evaluating the predictive model, counterfactual module 116 may use cross-validation to evaluate how well the predictive model generalizes to any unseen data. Immutable features may be identified by identifying those features that show consistent importance across multiple runs and different subsets of the training dataset. Mutable features may be identified by identifying those features that show fluctuating levels of importance over time or across different subsets of the training dataset. As described herein, mutable features are those used by counterfactual module 116 for counterfactual analysis of user models for prescriptive output.

According to some aspects, counterfactual module 116 may generate guidance and/or instructive data for a given scenario based on relationships between user models identified independently from the identification of counterfactuals used to generate the guidance and/or instructive data. For example, for a target user of user device 104A (e.g., a user with a digital identity status that falls below a threshold or intended status, etc.), user data and/or user profile-level data collected from third-party service 118 and user device 104A (e.g., analytic service providers, entity data repositories, telemetry data, etc.) may be used to generate a user model that is paired with the user model of another user, such as a user of user device 104N, with digital identity status influence element that best match the target user of user device 104A. The paired user of user device 104N may be a user with a digital identity that satisfies a particular threshold or meets a defined goal. Status influence elements from the user model of the paired user of user device 104N may be used as counterfactuals to generate guidance for improving, modifying, and/or altering the status of the digital identity of the target user of user device 104A.

According to some aspects of this disclosure, an algorithm that counterfactual module 116 may utilize for counterfactual analysis of user models for prescriptive output by initially identifying a user (or user device) that satisfies a given threshold and is most similar to a target user (or user device) is provided in Algorithm 1 below. According to some aspects, Algorithm 1 is just an example and other algorithms may be used for facilitating demographic predictions for content items.

Algorithm 1

Steps:

1. Identify a qualifying/quantifying threshold.
2. Identify a pool of users with attributes that satisfy (e.g., score at or above, etc.) the qualifying/quantifying threshold.
3. Select a target user based on a trigger condition (e.g., an indication that the target user fails to meet the qualifying/quantifying threshold, etc.)
4. Identify features eligible for reasonable correction.
5. Calculate the pairwise similarity between features of the target user and a user of the pool of users with attributes that satisfy the qualifying/quantifying threshold.
6. For iterate=1 to N (where N=any number of the pool of users with attributes that satisfy the qualifying/quantifying threshold), retrieve the most similar digital identity status influence elements eligible for reasonable correction identified from pairwise similarities.
4. Endfor.

According to some aspects of this disclosure, Algorithm 1 may be represented as an example Equation 1, provided below:

$$D = \sum_{k=1}^{n} \beta(Y)_k - \beta(X)_k \qquad \text{Equation 1}$$

As used in Equation 1, the variable k represents the number of digital identity status influence elements identified as eligible for reasonable correction. For example, for a user with a digital identity status (e.g., a low credit score, etc.) that causes the user to be denied for a loan or similar transaction, an amount of status influence elements or characteristics (e.g., number of accounts in collection, credit card utilization, total past due balances, number of trades currently 30-days or more past due, etc.) indicated by a user model of the user that could potentially be adjusted or optimized in some way may be represented by the variable k.

As used in Equation 1, the variable X represents the combination of transformed values (e.g., categorized as bins, intervals, etc.) for user model features (e.g., status influence elements, etc.) that apply to a target user (e.g., a user of user device 104A, user device 104A, etc.). As used in Equation 1, the variable Y represents transformed values (e.g., categorized as bins, intervals, etc.) for user model features (e.g., status influence elements, etc.) that apply to different users (e.g., user of user device(s) 104N, user device(s) 104N, etc.) that satisfy a given threshold (e.g., have a credit score above a set level, etc.).

As used in Equation 1, the variable β represents the assigned weights used for counterfactual analysis. According to some aspects of this disclosure, assigned weights may be predetermined based on domain-specific goals, knowledge, and/or the like. According to some aspects of this disclosure, assigned weights may be predetermined based on statistical methods including, but not limited to, linear regression to output coefficient values that may be interpreted as weights showing the relative importance of each factor in predicting the outcome. According to some aspects of this disclosure, assigned weights may be predetermined based on a predictive model trained to identify weights for counterfactual analysis based on a type of transaction and/or output goal. According to some aspects of this disclosure, assigned weights may be predetermined based on propensity score matching where status influence elements are weighed so that they are comparable in terms of the distribution of observed covariates, based on a request for an optimized user model for the type of transaction that indicates the respective weighted values, and/or based on counterfactual information extracted from a user model of a model user (e.g., a user with a digital identity that satisfies a status threshold, etc.). According to some aspects of this disclosure, any method of technique may be used to identify and/or determine assigned weights.

As shown in Equation 1, the resulting value D may be interpreted as a summation of the differences in transformed feature values (or binned values) between the target user (e.g., a user of user device 104A, user device 104A, etc.) and each of the individual users that satisfy the given threshold. The resulting value D quantifies the difference (or degree of similarity) between the target user and the users that satisfy the given threshold with regard to status influence elements or characteristics indicated by respective user models. An advantage of the result of Equation 1, particularly for improving the technological fields of transaction management, digital identity management, and/or e-commerce is that it allows for guidance instructions (e.g., counterfactual-based credit score improvement guidance, etc.) with deterministic and actionable insights into optimizing user interactions and personalizing user experience to be generated.

According to some aspects of this disclosure, as described herein, assumptions are made in the use of Equation 1. For example, the effectiveness of any resultant guidance instructions (e.g., counterfactual-based credit score improvement guidance, etc.) is contingent on no material and/or significant adverse occurrences that affect the ability of the target user to meet the qualifying/quantifying threshold. For example, in a scenario where a target user is a user with a declined credit application and guidance instructions indicate an action of decreasing credit utilization by ten percent, then it is expected that the target user will not offset any improvement in a credit profile resulting from the guidance instructions by getting a new delinquency on the credit file. Another assumption made in the use of Equation 1 is that any resultant guidance instructions from counterfactual analysis are derived from the subject attributes (e.g., attributes that satisfy the qualifying/quantifying threshold, etc.) and assigned weights, and are only deterministic with respect to the intended goal (e.g., the target user meeting the qualifying/quantifying threshold, etc.). For example, in a scenario where a target user is a user with a declined credit application, while custom rules and/or business rules may be integrated into the guidance instructions, other underwriting factors such as generic credit scores may need to be de-emphasized during analysis to avoid negative experiences for the target user. Additionally, an assumption made in the use of Equation 1 is that counterfactual analysis of user models for prescriptive output best serves users on the margin of a defined outcome (e.g., credit approval). Some users may have factors affecting a user model (e.g., severely low initial credit scores, etc.) that render the users ineligible for guidance to achieve the defined outcome (e.g., credit approval).

According to some aspects of this disclosure, as described herein, counterfactual analysis of user models for prescriptive output may include, but is not limited to, Equation 1. According to some aspects of this disclosure, other formulas and/or algorithms may be used for counterfactual analysis of user models for prescriptive output.

Figure 2:
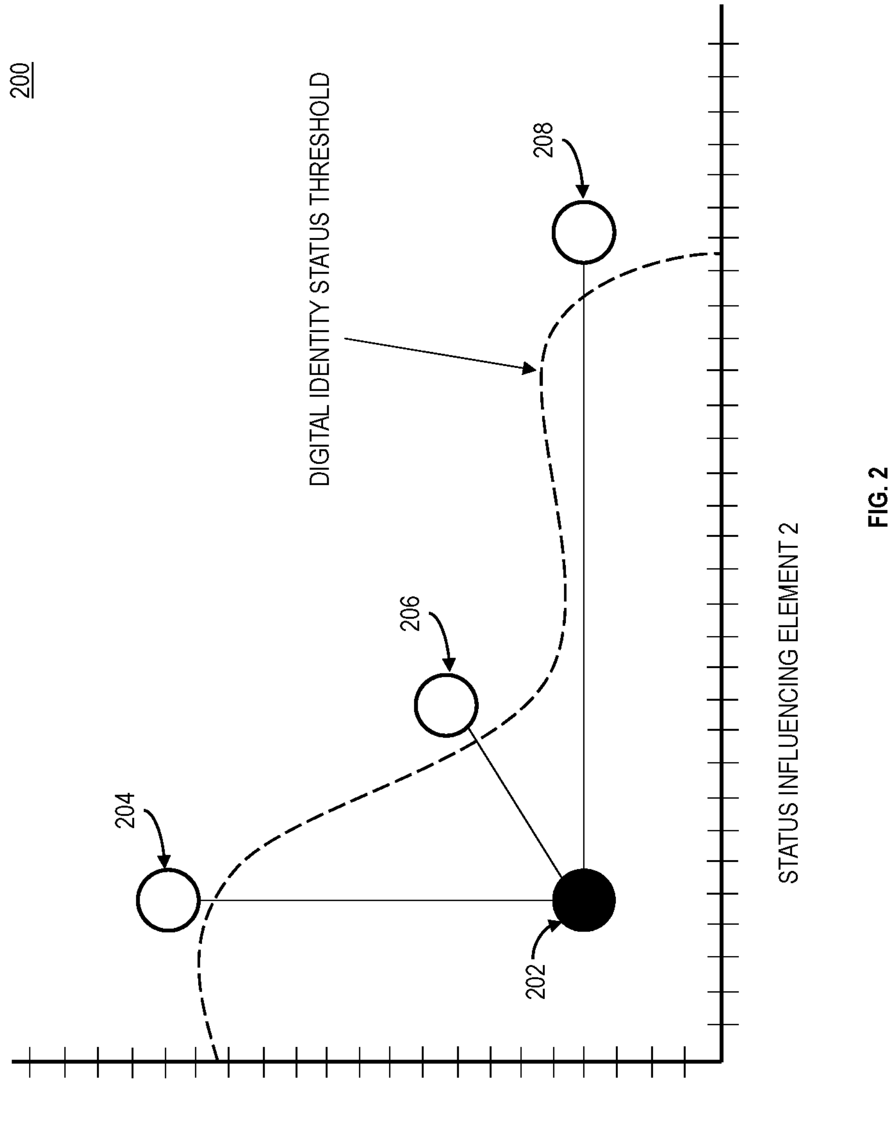
FIG. 2 is an example similarity graph for counterfactual analysis of user models for prescriptive output, according to some aspects of this disclosure.

FIG. 2 shows an example of a similarity graph 200 for a graphical depiction of an analytical process performed by counterfactual module 116 to identify users/user devices with similar user models as a target user to that counterfactual analysis may be performed to provide prescriptive information to the target user for improving, modifying, and/or altering the status of a digital identity for the target user. Similarity graph 200 uses inverted scales and may be derived based on a scenario where a target user of user device 104A is unable to complete a transaction (e.g., being approved for a loan, mortgage, purchase, etc.) due to the status of a digital identity (e.g., a credit score that falls below a threshold, etc.).

In similarity graph 200 it is assumed a user model related to a credit score has two status influence elements that may be plausibly modified within a given timeframe to change the status of the digital identity of a target user 202 represented by similarity graph 200. Target user 202 is compared to user 204, user 206, and user 208, each represented in similarity graph 200 with digital identity statuses that satisfy a digital identity status threshold 210 and enable completion of the transaction (e.g., being approved for a loan, mortgage, purchase, etc.).

Counterfactual module 116 may calculate and/or identify pairwise distances between target user 202 and users 204-208. The shortest distance between the target user 202 and users 204-208 may indicate the counterfactual user with a user model with status influence elements that may be used to modify the user model of the target user 202. As shown in similarity graph 200, user 206 is indicated as a counterfactual user based on the shortest path between user 206 and target user 202. Instructions for modifying the status of the digital identity for target user 202 to satisfy the digital identity status threshold may be generated from a user model modified according to mutable status influence elements of the user model of user 206.

Modifying the user model of target user 202 according to the target user according to mutable status influence elements of the user model of user 206 may include replacing at least one status influence element of the user model of target user 202 with at least one mutable status influence elements of the user model of user 206. According to some aspects of this disclosure, modifying the user model of target user 202 according to the mutable status influence elements of the user model of user 206 may include time-shifting an action indicated by at least one status influence element of the user model of target user 202 according to timing associated with an action indicated by at least one mutable status influence elements of the user model of user 206. According to some aspects of this disclosure, counterfactual module 116 may use any method to modify the user model of a target user according to status influence elements indicated by a user model of another user.

Instructions for modifying the status of the digital identity for target user 202 may include specific, deterministic information describing how to modify the status of the digital identity for target user 202 to satisfy the digital identity status threshold based on empirical data identified from the user model of user 206. According to some aspects of this disclosure, the prescriptive output is a credit score output (such as may be output by a credit bureau), the status influence elements are factors that influence a credit score, and the counterfactual analysis provides a user with options that may improve their credit score, in general, or to a given level.

Figure 3:
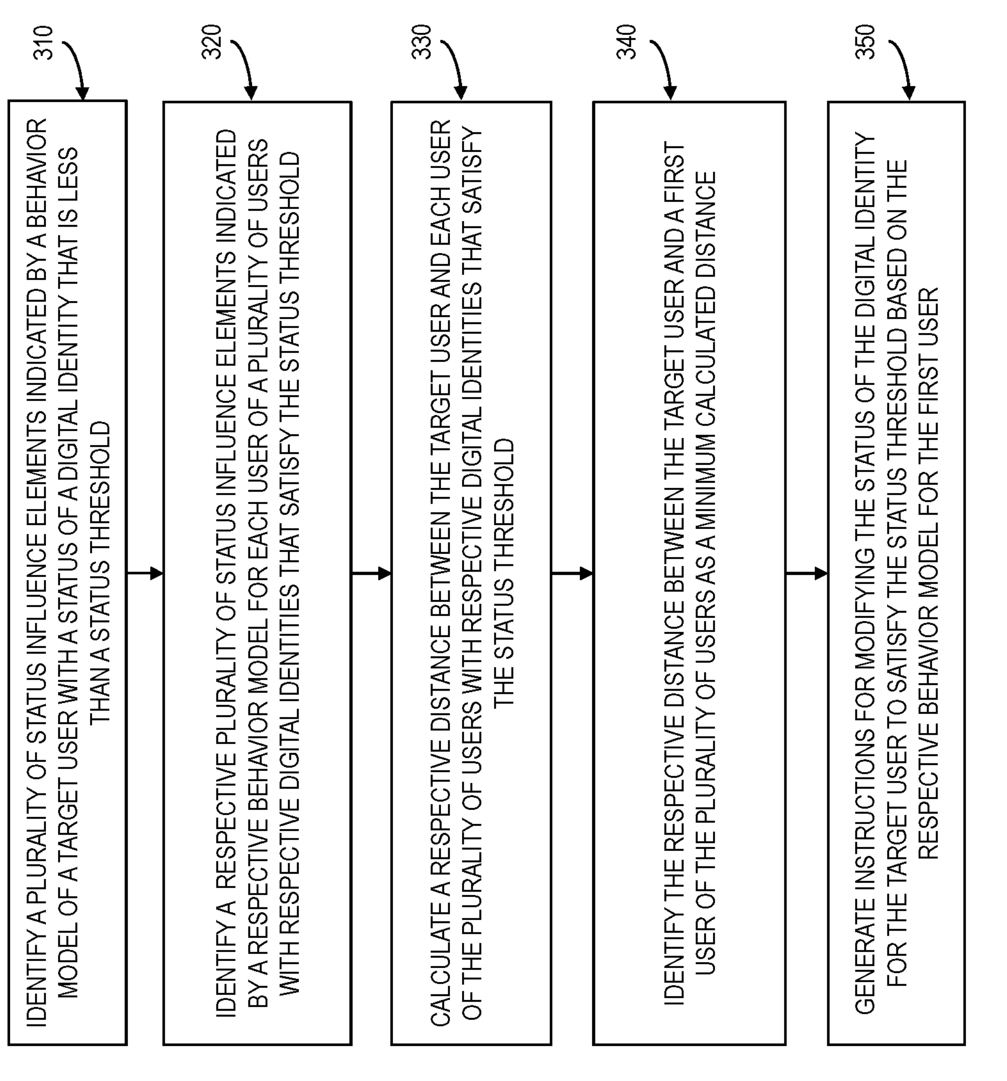
FIG. 3 is a flowchart of an example method for counterfactual analysis of user models for prescriptive output, according to some aspects of this disclosure.

FIG. 3 is a flowchart for an example method 300 for counterfactual analysis of user models for prescriptive output, according to aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2. However, method 300 is not limited to those figures or related aspects.

In 310, computing device 110 identifies a plurality of status influence elements indicated by a user model of a target user. For example, computing device 110 may identify the plurality of status influence elements indicated by the user model of the target user based on an indication that a status of a digital identity for the target user is less than a status threshold for digital identities eligible for a transaction. The transaction may include, but is not limited to, qualifying for a financial object, completing a purchase, and/or the like.

According to some aspects of this disclosure, the plurality of status influence elements indicated by the user model of the target user may be selected as a subset of a larger plurality of status influence elements indicated by the user model of the target user based on an indication that the plurality of status influence elements are mutable to an achievable goal within a timeframe. According to some aspects of this disclosure, the indication that the plurality of status influence elements are mutable to an achievable goal within the timeframe may be output by a predictive model trained to evaluate the mutability of status influence elements associated with user models according to aspects disclosed herein.

In 320, computing device 110 identifies a respective plurality of status influence elements indicated by a respective user model for each user of a pool of users with respective digital identities that satisfy the status threshold.

In 330, computing device 110 calculates a respective distance between the target user and each user of the pool with respective digital identities that satisfy the status threshold. For example, computing device 110 may calculate the respective distance between the target user and each user of the pool based on respective weighted values assigned to the respective plurality of status influence elements of the respective user model for each user of the pool. The respective distance may also be based on the plurality of status influence elements indicated by the user model of the target user. The weighted values may represent a degree of influence on eligibility for the transaction assigned to the respective plurality of influence elements.

According to some aspects of this disclosure, the assigned weighted values for the respective plurality of status influence elements of the user models of the target user and the pool of users may be determined from at least one of: a predictive model trained to identify weights for counterfactual analysis based on a type of the transaction, or a request for an optimized user model for the type of the transaction that indicates the assigned weighted values.

In 340, computing device 110 identifies a model user from the pool of users based on the respective distance between the target user and the model user being a minimum calculated distance.

In 350, computing device 110 generates instructions for modifying the status of the digital identity for the target user to satisfy the status threshold for digital identities eligible for the transaction. For example, computing device 110 may generate the instructions for modifying the status of the digital identity for the target user based on the respective user model for the first user. According to some aspects of this disclosure, computing device 110 generates the instructions for modifying the status of the digital identity for the target user by generating an instruction for the target user or a user device associated with the target user to perform an action indicated by at least one of the respective plurality of status influence elements indicated by the respective user model for the first user. For example, in an implementation or scenario where the target user is attempting to increase their credit score to a threshold required for a given transaction, the model may instruct the target user that paying down a particular account balance to a given level within a given timeframe may result in the desired increase based on an indication that the model user has an account balance at the given level.

According to some aspects of this disclosure, computing device 110 may send the instructions for modifying the status of the digital identity of the target user to a user device associated with the target user.

According to some aspects of this disclosure, computing device 110 may cause the transaction to be authorized and/or the target user to be authorized for the transaction based on an indication that the instructions for modifying the status of the digital identity for the target are executed. For example, based on an indication that the target user and/or the user device associated with the target user executes at least one of the instructions for modifying the status of the digital identity, computing device 110 may send a signal/instruction to a device/system (e.g., third party systems 118, etc.) associated with the transaction to cause the transaction to be authorized and/or the target user to be authorized for the transaction.

EXAMPLES

FIG. 4 shows an example comparison chart 400 highlighting the advantages of guidance instructions output based on counterfactual analysis of user models for prescriptive output, as described herein, in comparison to adverse action code generation (a traditional explainability method used in the technological field of credit score management). As described herein, counterfactual analysis of user models for prescriptive output enables credit application decline reasons to be empirically ranked, uses flexible reference points that are linked to a credit approval cutoff score, limits its output to actions that can be reasonably undertaken by a user (e.g., declined credit applicant, etc.), and can be implemented without an established and enforced regulatory framework.

FIG. 5 shows an example chart 500 of status influence elements from user models for a target user 502 that has been denied credit approval based on a credit score (e.g., 650) and a model user 504 with a credit approval based on a credit score (e.g., 700). As shown, some of the status influence elements from the user models of the target user 502 and model user 504 may be invariant and immutable, such as the length of a credit experience and the number of past due trades. Some of the status influence elements from the user models of the target and model users may exhibit parity between the target and model users. Status influence elements from the user models of the target and model users that are mutable, such as credit card utilization, total past due balances, total unpaid non-medical collections, and the number of trades 30 days past due or less, may be used for counterfactual analysis. According to some aspects of this disclosure, the status influence elements shown in FIG. 5 are only examples and any other status influence elements may be used for counterfactual analysis of user models for prescriptive output.

As described herein, counterfactual analysis of user models for prescriptive output enables at least three use cases for entities such as lenders (e.g., individuals, public groups, private groups, and/or a financial institution that makes funds available, etc.) and/or the like that include: enhanced user/customer experience, trial credit approvals with low exposure, and flexible credit policy adjustments. As an example, to enhance the lender user/customer experience, the application of counterfactual analysis of user models for prescriptive output enables a change in the type of communication lenders have with declined credit applicants. Lenders may improve the message to users/consumers regarding a decision to decline a credit approval, particularly for marginally declined users/customers, by pointing to specific achievable actions that are relatable to the user/consumer and would help secure an approval next time. Based on counterfactual analysis of user models for prescriptive output users/consumers with counterfactual qualifying criteria may be provided a roadmap to approval, an invitation to reapply for credit. The production of such a roadmap and the offering of the invitation to reapply for credit provide high-touch customer service with cross-selling incentives.

To support trial credit approvals with low exposure, counterfactual analysis of user models for prescriptive output enables lenders to approve credit for select users/consumers that initially have been declined credit approval. The select users/consumers may be approved for low and/or secured lines of credit under the conditions that the low and/or secured lines of credit may transition to the full product credit lines within a set timeframe if prescriptive output and/or counterfactual guidance is followed by the user/consumer. Trial credit approvals with low exposure create an incentive for users/consumers to establish a long-term relationship with a lender and/or related entity while minimizing financial exposure for the lender and/or related entity. Trial credit approvals with low exposure amply the incentive for users/consumers to adhere to prescriptive output and/or counterfactual guidance. Based on counterfactual analysis of user models for prescriptive output users/consumers with counterfactual qualifying criteria may receive trial credit approvals with low exposure provided as lender/entity product cross-sell incentive.

Figure 6:
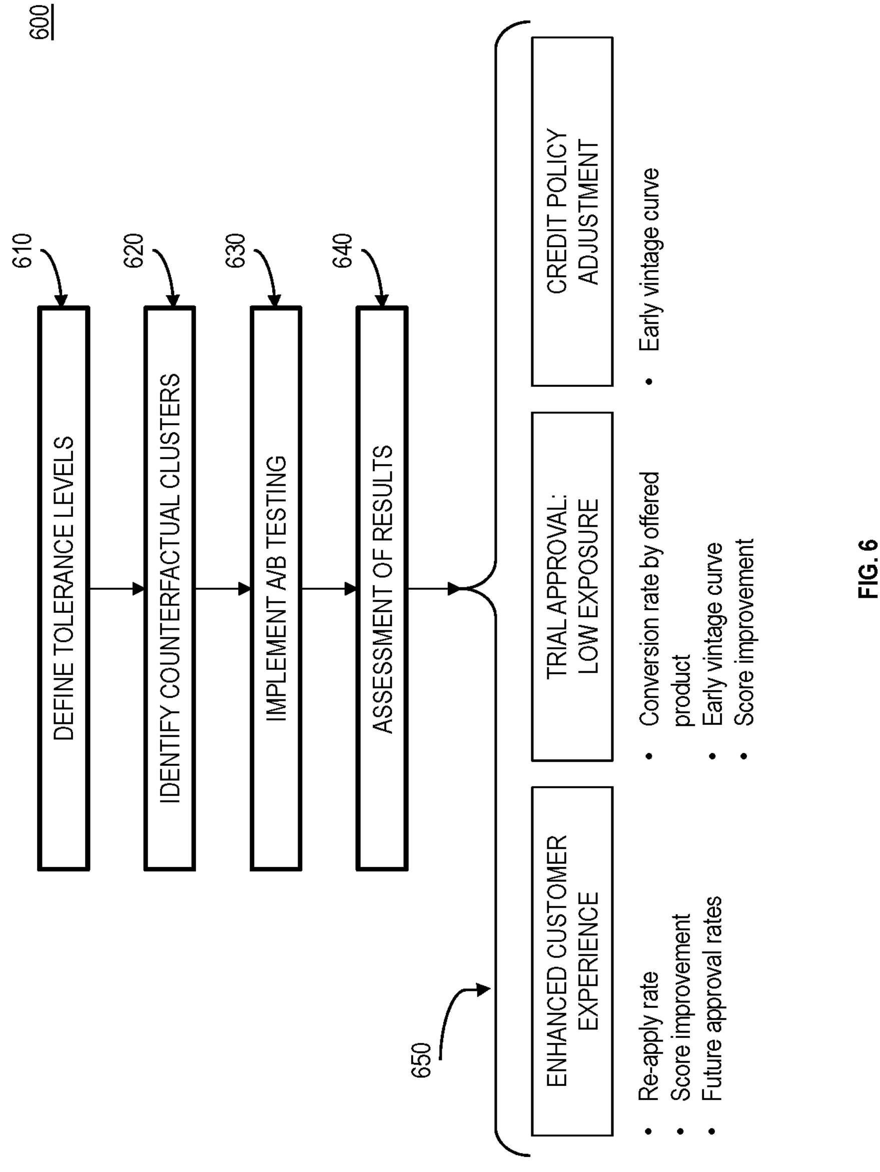
FIG. 6 is a flowchart of an example method for counterfactual analysis of user models for prescriptive output, according to some aspects of this disclosure.

As described herein, counterfactual analysis of user models for prescriptive output enables lenders and related entities to leverage counterfactual-derived insights to proactively adjust credit policy and forgo attempts to induce a change in user/consumer behavior. Counterfactual analysis of user models for prescriptive output may be implemented in a manner that is transparent to users/consumers with marginally declined credit approvals and counterfactual qualifying criteria, yet still provides immediate reward in credit approval volumes without delays or contingencies. FIG. 6 is a generalized flowchart for an example method 600 for counterfactual analysis of user models for prescriptive output, according to aspects of this disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-5. However, method 600 is not limited to those figures or related aspects.

In 610, computing device 110 defines tolerance levels for counterfactual analysis of user models.

In 620, computing device 110 identifies counterfactual clusters. For example, a counterfactual cluster may include a pool of users that satisfy a given threshold, such as users who have been approved for credit or have a credit score at or above a given level.

In 630, computing device 110 implements A/B testing of the counterfactual clusters in relation to a target user. A target user may be a user who has been denied credit approval or has a credit score below the given level. Such testing may involve, for example, implementing a model used to determine path differences between the target user and each user in the pool.

In 630, computing device 110 assesses the results of the A/B testing to identify a user from the counterfactual clusters most similar to the target user. The most similar user may be determined, for example, as the user in the pool having the shortest path length to the target user as determined by the A/B testing model.

In 640, computing device 110 (or a user of computing device 110) realizes the benefit of counterfactual analysis of user models for prescriptive output. As described herein, counterfactual analysis of user models for prescriptive output enables at least three use cases for entities such as lenders (e.g., individuals, public groups, private groups, and/or a financial institution that makes funds available, etc.) and/or the like that include: enhanced user/customer experience, trial credit approvals with low exposure, and flexible credit policy adjustments.

Figure 7:
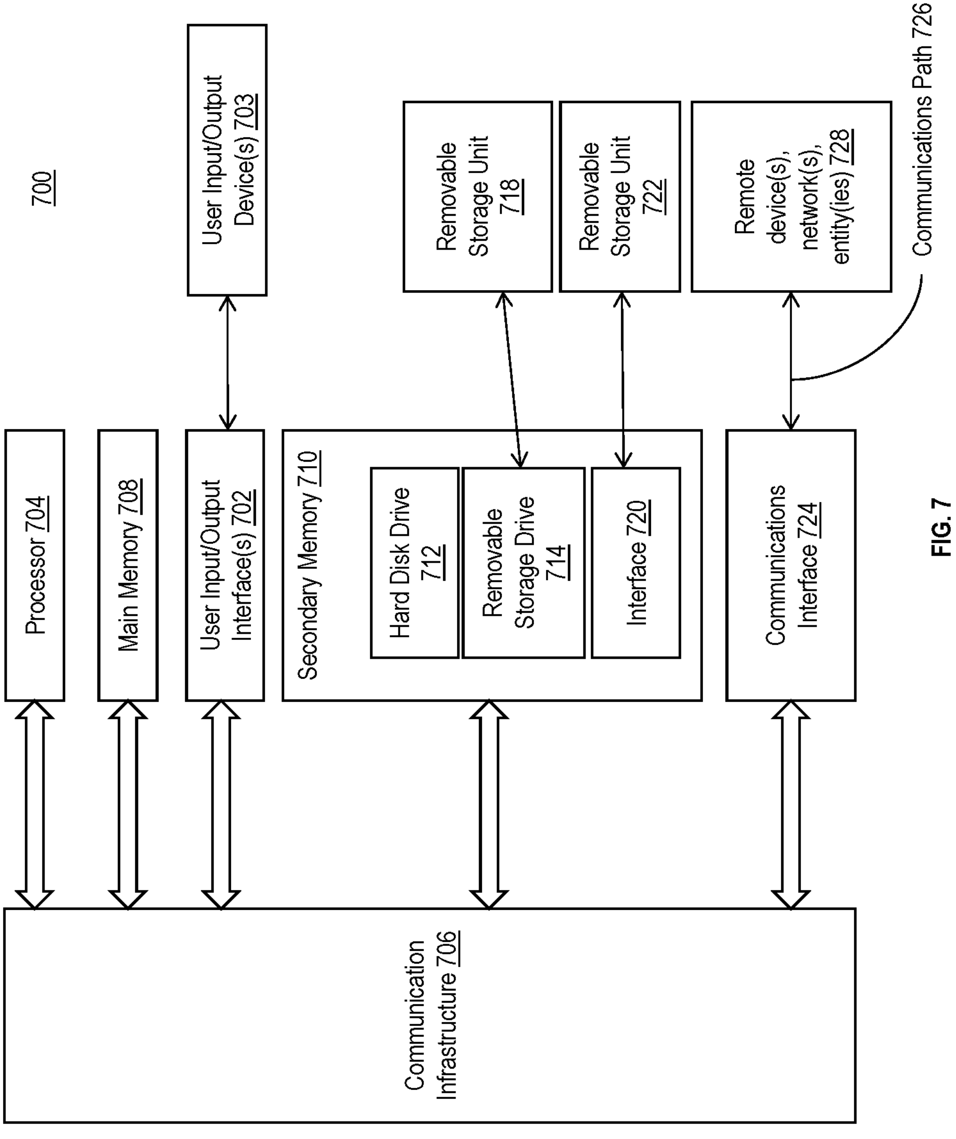
FIG. 7 is an example computer system useful for implementing various aspects of this disclosure.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, a tape backup device, and/or any other storage device/drive.

Removable storage drive 714 may interact with a removable storage unit 718. Removable storage unit 718 may include a computer-usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities, or other approaches for allowing computer programs and/or other instructions and/or data to be accessed by computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expressions "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

What is claimed is:

1. A method comprising:

identifying a plurality of status influence elements indicated by a user model of a target user based on an indication that a status of a digital identity for the target user is less than a status threshold;

identifying a respective plurality of status influence elements indicated by a respective user model for each user of a pool of users with respective digital identities that satisfy the status threshold;

generating a plurality of respective distances by calculating a respective distance between the target user and each user of the pool of users, wherein each respective distance is calculated from respective weighted values that represent a degree of influence on eligibility for a transaction assigned to the respective plurality of status influence elements indicated by the respective user model for each user of the pool of users and the plurality of status influence elements indicated by the user model of the target user;

identifying, from the plurality of respective distances, a minimum calculated respective distance;

in response to identifying the minimum calculated respective distance, identifying a model user from the pool of users, wherein the model user corresponds to the minimum calculated respective distance and differs from the target user; and generating, using status influence elements from the respective user model corresponding to the identified model user, instructions for modifying the status of the digital identity for the target user to satisfy the status threshold.

2. The method of claim 1, further comprising sending the instructions for modifying the status of the digital identity for the target user to a user device associated with the target user.

3. The method of claim 2, further comprising authorizing the target user for the transaction based on an indication that the instructions for modifying the status of the digital identity for the target are executed.

4. The method of claim 1, wherein the plurality of status influence elements indicated by the user model of the target user are selected as a subset of a larger plurality of status influence elements indicated by the user model of the target user based on an indication that the plurality of status influence elements are mutable within a timeframe.

5. The method of claim 4, wherein the indication that the plurality of status influence elements are mutable within the timeframe is output from a predictive model trained to evaluate the mutability of status influence elements associated with user models.

6. The method of claim 1, wherein the respective weighted values assigned to the respective plurality of status influence elements indicated by the respective user model for each user of the pool of users and the plurality of status influence elements indicated by the user model of the target user are determined from at least one of: a predictive model trained to identify weights for counterfactual analysis based on a type of the transaction, a request for an optimized user model for the type of the transaction that indicates the respective weighted values, or based on counterfactual information extracted from a user model for another user with a digital identity that satisfies the status threshold.

7. The method of claim 1, wherein the generating the instructions for modifying the status of the digital identity for the target user further comprises generating an instruction for the target user or a user device associated with the target user to perform an action indicated by at least one of the respective plurality of status influence elements indicated by the respective user model for the model user.

8. A system, comprising:

a memory; and at least one processor coupled to the memory and configured to perform operations comprising:

identifying a plurality of status influence elements indicated by a user model of a target user based on an indication that a status of a digital identity for the target user is less than a status threshold;

identifying a respective plurality of status influence elements indicated by a respective user model for each user of a pool of users with respective digital identities that satisfy the status threshold;

generating a plurality of respective distances by calculating a respective distance between the target user and each user of the pool of users, wherein each respective distance is calculated from respective weighted values that represent a degree of influence on eligibility for a transaction assigned to the respective plurality of status influence elements indicated by the respective user model for each user of the pool of users and the plurality of status influence elements indicated by the user model of the target user;

identifying, from the plurality of respective distances, a minimum calculated respective distance;

in response to identifying the minimum calculated respective distance, identifying a model user from the pool of users, wherein the model user corresponds to the minimum calculated respective distance and differs from the target user; and generating, using status influence elements from the respective user model corresponding to the identified model user, instructions for modifying the status of the digital identity for the target user to satisfy the status threshold.

9. The system of claim 8, the operations further comprising sending the instructions for modifying the status of the digital identity for the target user to a user device associated with the target user.

10. The system of claim 9, the operations further comprising authorizing the target user for the transaction based on an indication that the instructions for modifying the status of the digital identity for the target are executed.

11. The system of claim 8, wherein the plurality of status influence elements indicated by the user model of the target user are selected as a subset of a larger plurality of status influence elements indicated by the user model of the target user based on an indication that the plurality of status influence elements are mutable within a timeframe.

12. The system of claim 11, wherein the indication that the plurality of status influence elements are mutable within the timeframe is output from a predictive model trained to evaluate the mutability of status influence elements associated with user models.

13. The system of claim 8, wherein the respective weighted values assigned to the respective plurality of status influence elements indicated by the respective user model for each user of the pool of users and the plurality of status influence elements indicated by the user model of the target user are determined from at least one of: a predictive model trained to identify weights for counterfactual analysis based on a type of the transaction, a request for an optimized user model for the type of the transaction that indicates the respective weighted values, or based on counterfactual information extracted from a user model for another user with a digital identity that satisfies the status threshold.

14. The system of claim 8, wherein the generating the instructions for modifying the status of the digital identity for the target user further comprises generating an instruction for the target user or a user device associated with the target user to perform an action indicated by at least one of the respective plurality of status influence elements indicated by the respective user model for the model user.

15. A non-transitory computer-readable medium having instructions stored thereon that, when executed by at least one computing device, cause the at least one computing device to perform operations comprising:

identifying a plurality of status influence elements indicated by a user model of a target user based on an indication that a status of a digital identity for the target user is less than a status threshold;

identifying a respective plurality of status influence elements indicated by a respective user model for each user of a pool of users with respective digital identities that satisfy the status threshold;

generating a plurality of respective distances by calculating a respective distance between the target user and each user of the pool of users, wherein each respective distance is calculated from respective weighted values that represent a degree of influence on eligibility for a transaction assigned to the respective plurality of status influence elements indicated by the respective user model for each user of the pool of users and the plurality of status influence elements indicated by the user model of the target user;

identifying, from the plurality of respective distances, a minimum calculated respective distance;

in response to identifying the minimum calculated respective distance, identifying a model user from the pool of users, wherein the model user corresponds to the minimum calculated respective distance and differs from the target user; and generating, using status influence elements from the respective user model corresponding to the identified model user, instructions for modifying the status of the digital identity for the target user to satisfy the status threshold.

16. The non-transitory computer-readable medium of claim 15, the operations further comprising sending the instructions for modifying the status of the digital identity for the target user to a user device associated with the target user.

17. The non-transitory computer-readable medium of claim 16, the operations further comprising authorizing the target user for the transaction based on an indication that the instructions for modifying the status of the digital identity for the target are executed.

18. The non-transitory computer-readable medium of claim 15, wherein the plurality of status influence elements indicated by the user model of the target user are selected as a subset of a larger plurality of status influence elements indicated by the user model of the target user based on an indication that the plurality of status influence elements are mutable within a timeframe.

19. The non-transitory computer-readable medium of claim 18, wherein the indication that the plurality of status influence elements are mutable within the timeframe is output from a predictive model trained to evaluate the mutability of status influence elements associated with user models.

20. The non-transitory computer-readable medium of claim 15, wherein the respective weighted values assigned to the respective plurality of status influence elements indicated by the respective user model for each user of the plurality of users and the plurality of status influence elements indicated by the user model of the target user are determined from at least one of: a predictive model trained to identify weights for counterfactual analysis based on a type of the transaction, a request for an optimized user model for the type of the transaction that indicates the respective weighted values, or based on counterfactual information extracted from a user model for another user with a digital identity that satisfies the status threshold.

* * * * *